US012722890B2

(12) United States Patent
Takagi et al.

(10) Patent No.: US 12,722,890 B2
(45) Date of Patent: Sep. 1, 2026

(54) SORTING SYSTEM, SORTING METHOD, AND PROGRAM

(71) Applicant: TOYOTA JIDOSHA KABUSHIKI KAISHA, Toyota (JP)

(72) Inventors: Yutaro Takagi, Edogawa-ku (JP); Junya Ota, Edogawa-ku (JP); Takatoshi Morimitsu, Toyota (JP); Kunihiro Iwamoto, Nagakute (JP); Uori Koike, Saitama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 401 days.

(21) Appl. No.: 18/462,046

(22) Filed: Sep. 6, 2023

(65) Prior Publication Data

US 2024/0116711 A1 Apr. 11, 2024

(30) Foreign Application Priority Data

Oct. 7, 2022 (JP) ................................. 2022-162111

(51) Int. Cl.
*B65G 1/137* (2006.01)
*B25J 11/00* (2006.01)

(52) U.S. Cl.
CPC ............. *B65G 1/137* (2013.01); *B25J 11/005* (2013.01); *B65G 2201/0235* (2013.01)

(58) Field of Classification Search
CPC ............ B65G 1/137; B65G 2201/0235; B07C 2501/0063; B07C 5/36; B07C 3/14; B07C 3/008; B07C 3/02; B25J 11/005; B25J 9/0018; B25J 5/02
USPC .......................................................... 700/214
See application file for complete search history.

(56) References Cited

U.S. PATENT DOCUMENTS

| | | | | |
|---|---|---|---|---|
| 10,556,334 | B1 * | 2/2020 | Theobald | B25J 9/1679 |
| 10,865,043 | B1 * | 12/2020 | Garcia | G06Q 10/087 |
| 11,235,930 | B2 * | 2/2022 | Bastian, II | B25J 15/0616 |
| 2018/0342031 | A1 * | 11/2018 | Tada | H04N 9/3194 |
| 2019/0291955 | A1 * | 9/2019 | Bastian, II | B65G 1/1373 |
| 2021/0061563 | A1 * | 3/2021 | Ueda | B25J 9/0018 |
| 2021/0130095 | A1 * | 5/2021 | Ueda | B65G 1/1375 |
| 2021/0354925 | A1 * | 11/2021 | Durai | B65G 1/0485 |
| 2021/0371200 | A1 * | 12/2021 | Thorhallsson | B25J 9/023 |
| 2022/0122031 | A1 * | 4/2022 | Powers | B65B 5/12 |
| 2022/0324658 | A1 * | 10/2022 | Cedarleaf-Pavy | B65G 47/44 |

(Continued)

FOREIGN PATENT DOCUMENTS

| | | | |
|---|---|---|---|
| JP | 2001-261125 | A | 9/2001 |
| JP | 2019-043753 | A | 3/2019 |

(Continued)

*Primary Examiner* — Mohamed Abdo Algehaim
(74) *Attorney, Agent, or Firm* — Oliff PLC

(57) ABSTRACT

A sorting system, a sorting method, and a program that can reduce the time required for sorting items using a shelf are achieved. A sorting system according to an embodiment of the present disclosure includes a shelf in which a plurality of boxes are contained in a plurality of tiers, transfer means for putting each box in or taking it out of the shelf, and a sorting robot attached to the shelf configured to put an item in or take it out of each box. The transfer means pulls the box contained in an upper tier halfway out and the sorting robot puts in or takes the item out of each of the box contained in the upper tier and the box contained in the lower tier.

9 Claims, 11 Drawing Sheets

(56) References Cited

U.S. PATENT DOCUMENTS

| | | | | |
|---|---|---|---|---|
| 2022/0371821 | A1 * | 11/2022 | Cheng | B65G 1/0435 |
| 2023/0159273 | A1 * | 5/2023 | Galante | B65G 1/0435<br>414/277 |
| 2023/0264897 | A1 * | 8/2023 | Stadie | B65G 1/0464<br>700/214 |
| 2023/0415345 | A1 * | 12/2023 | Zizka | B25J 5/007 |
| 2024/0043212 | A1 * | 2/2024 | Douglas | B25J 9/0093 |
| 2024/0199333 | A1 * | 6/2024 | Zizka | B65G 1/1373 |
| 2025/0051149 | A1 * | 2/2025 | Liu | G06Q 10/087 |

FOREIGN PATENT DOCUMENTS

| | | | | | |
|---|---|---|---|---|---|
| JP | 2019137543 | A | * | 8/2019 | B65G 1/10 |
| JP | 2021-121569 | A | | 8/2021 | |
| JP | 2022114641 | A | * | 8/2022 | |

* cited by examiner

SORTING SYSTEM, SORTING METHOD, AND PROGRAM

CROSS REFERENCE TO RELATED APPLICATIONS

This application is based upon and claims the benefit of priority from Japanese patent application No. 2022-162111, filed on Oct. 7, 2022, the disclosure of which is incorporated herein in its entirety by reference.

BACKGROUND

The present disclosure relates to a sorting system, a sorting method, and a program.

Japanese Unexamined Patent Application Publication No. 2019-043753 proposes a technique for sorting items in a box.

SUMMARY

Sorting may be performed using a sorting robot on a shelf on which boxes can be contained. In such cases, there is a problem that sorting takes time, because it takes time to replace the boxes. There is also a problem that when the items in the box overlap, it is difficult to grasp the items and it takes time to sort them.

The present disclosure has been made in view of such a problem and achieves a sorting system, a sorting method, and a program that can reduce the time required for sorting items using a shelf.

A sorting system according to an aspect of the present disclosure includes:

- a shelf in which a plurality of boxes are contained in a plurality of tiers;
- transfer means for putting each box in or taking it out of the shelf; and
- a sorting robot attached to the shelf configured to put an item in or take it out of each box, wherein
- the transfer means pulls the box contained in an upper tier halfway out and the sorting robot puts in or takes the item out of each of the box contained in the upper tier and the box contained in the lower tier.

A sorting method according to an aspect of the present disclosure performed by a sorting system including:

- a shelf in which a plurality of boxes are contained in a plurality of tiers;
- transfer means for putting each box in or taking it out of the shelf; and
- a sorting robot attached to the shelf configured to put an item in or take it out of each box, the sorting method including, by the transfer means, pulling the box contained in an upper tier halfway out and the sorting robot putting in or taking the item out of each of the box contained in the upper tier and the box contained in the lower tier.

A program according to an aspect of the present disclosure causes computer to execute a sorting method performed by a sorting system including:

- a shelf in which a plurality of boxes are contained in a plurality of tiers;
- transfer means for putting each box in or taking it out of the shelf; and
- a sorting robot attached to the shelf configured to put an item in or take it out of each box, the sorting method including, by the transfer means, pulling the box contained in an upper tier halfway out and the sorting robot putting in or taking the item out of each of the box contained in the upper tier and the box contained in the lower tier.

According to the present disclosure, it is possible to achieve a sorting system, a sorting method, and a program that can reduce the time required for sorting items using a shelf.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. In addition, in order to clarify the explanation, the following descriptions and drawings have been simplified as appropriate.

First Embodiment

Figure 1:
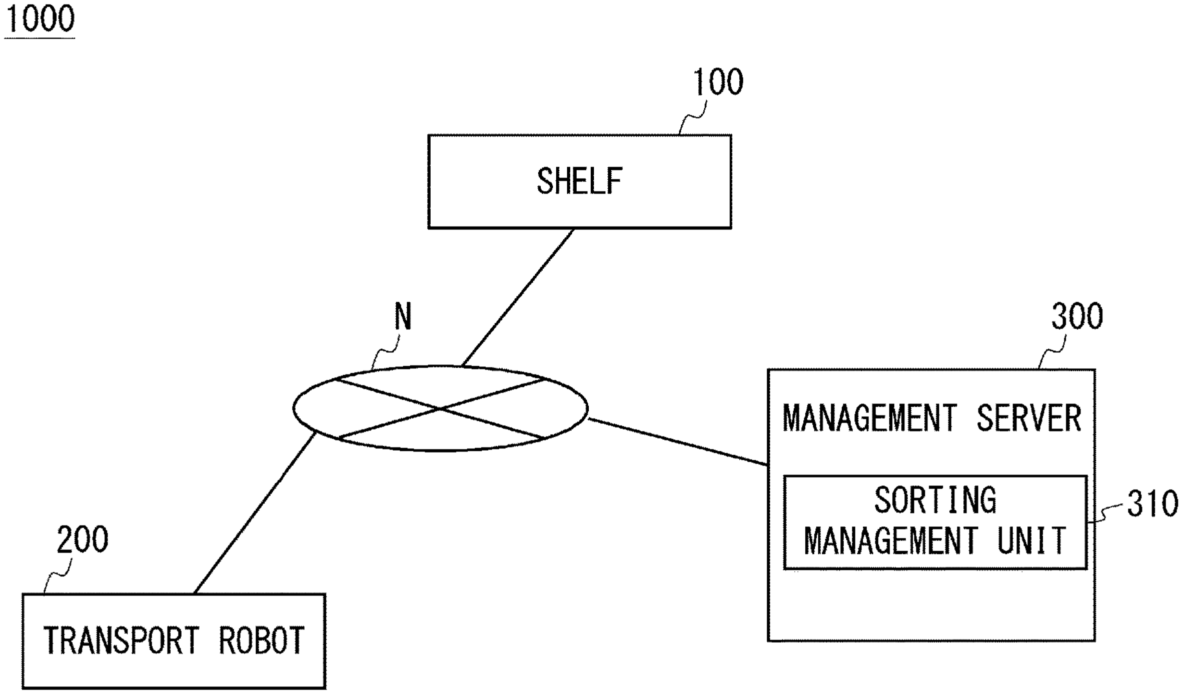
FIG. 1 is a block diagram showing a configuration of a sorting system according to a first embodiment.

A sorting system according to a first embodiment will be described below with reference to the drawings. FIG. 1 is a schematic diagram showing a configuration of a sorting system 1000 according to the first embodiment. The sorting system 1000 includes a shelf 100, a transport robot 200, and a management server 300. The shelf 100, the transport robot 200, and the management server 300 are connected via a network N so as to be able to communicate with each other. The network N may be wired or wireless.

A plurality of boxes are contained in a plurality of tiers of the shelf 100. The shelf 100 includes a sorting robot, which disposes designated items into each box. The transport robot 200 puts the boxes in the shelf and takes them out of the shelf 100. The management server 300 is a server that manages the sorting system 1000.

Each of the shelf 100, the transport robot 200, and the management server 300 includes an arithmetic unit such as a CPU (Central Processing Unit) and a storage unit such as a RAM (Random Access Memory) and a ROM (Read Only Memory) in which various control programs, data and the like are included. That is, the shelf 100, the transport robot 200, and the management server 300 all have functions as computers and perform processing based on the various control programs described above.

The processing by the management server 300 may be performed on the shelf 100 side and the transport robot 200 side. Therefore, even if the management server 300 is not included, it may be included in the sorting system 1000 according to the first embodiment.

Figure 2:
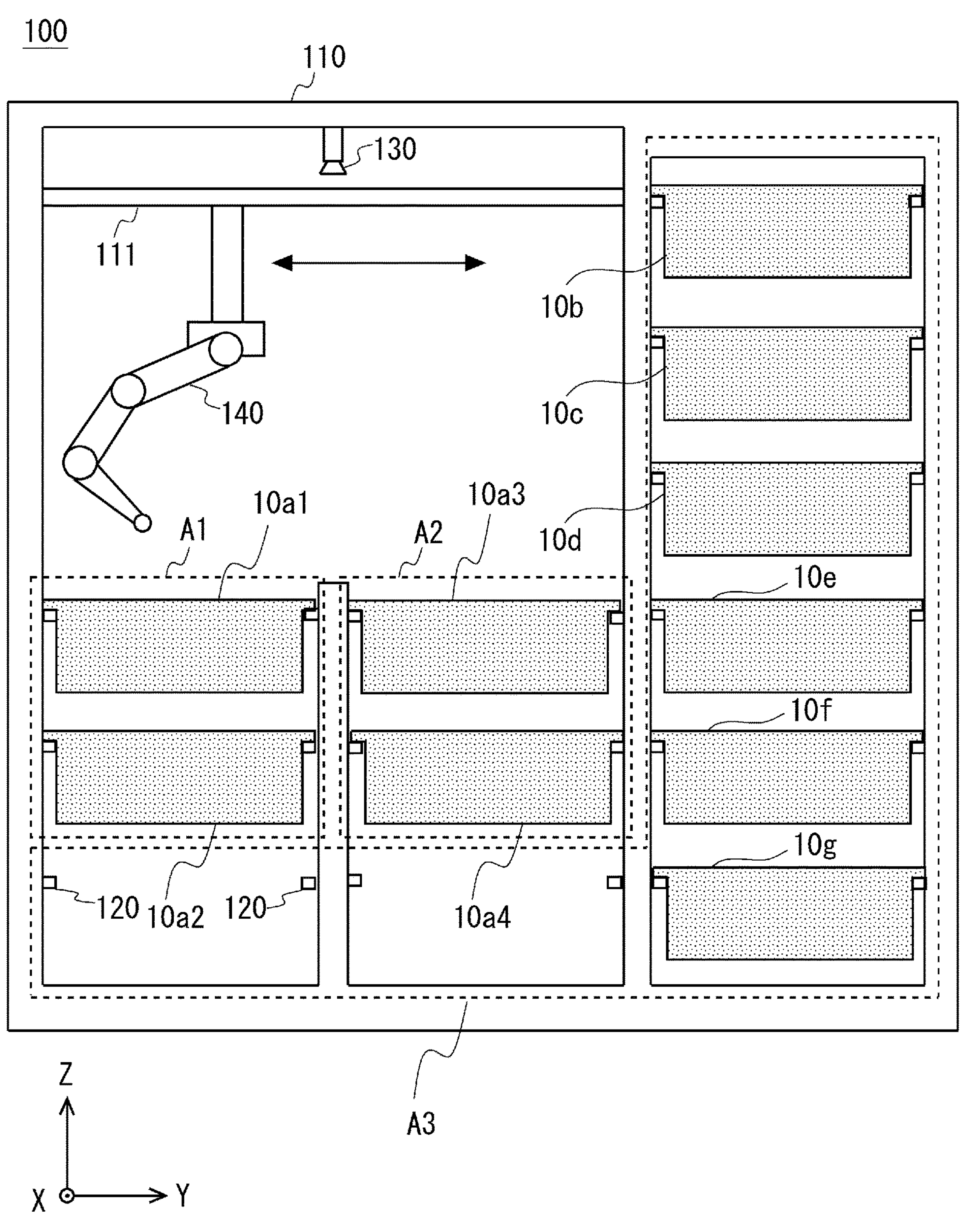
FIG. 2 is a schematic front view of a shelf according to the first embodiment.

Next, the shelf 100 will be described with reference to FIG. 2. FIG. 2 is a schematic front view of the shelf 100. Note that, as a matter of course, the right-handed XYZ coordinates shown in FIG. 2 and other drawings are for convenience in explaining the positional relationships of the components. Usually, the positive orientation of the Z-axis is vertically upward, and the XY plane is the horizontal plane, which are common among the drawings.

The shelf 100 includes a housing 110, plurality of pairs of rails 120, an imaging unit 130, and a sorting robot 140. To facilitate understanding, boxes 10 are shown hatched.

The housing 110 includes a top plate provided on a Z-axis positive direction side, a bottom plate provided on the Z-axis negative direction side, and side plates provided on the Y-axis positive and negative direction sides. The imaging unit 130 is attached to the top plate. The housing 110 also includes a guide rail 111 for attaching the sorting robot 140.

The plurality of pairs of rails 120 extend in a depth direction (X-axis direction) and are equally spaced in a height direction (Z-axis direction) inside the housing 110. The plurality of boxes 10 are contained along the plurality of pairs of rails 120.

Figure 3:
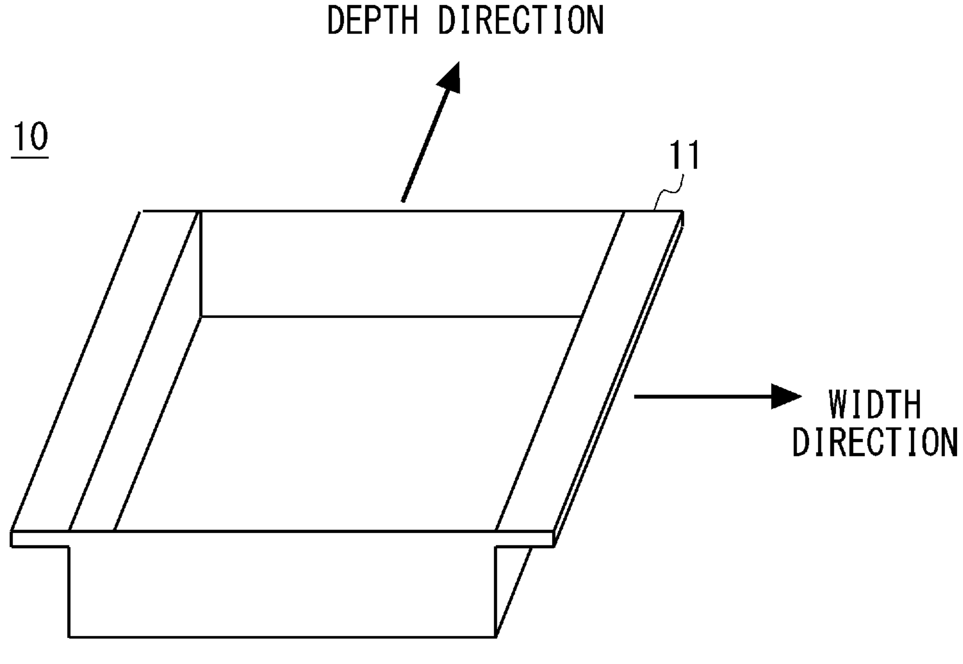
FIG. 3 is a perspective view of a box according to the first embodiment.

FIG. 3 is a schematic perspective view of the box 10. With reference to FIG. 3, the box 10 has protrusions 11 that protrude in a width direction (Y-axis direction in FIG. 2). The protrusions 11 extend in the depth direction of the box (X-axis direction in FIG. 2). One of the protrusions 11 is supported by one of the rails 120, and the other of the protrusions 11 is supported by the other of the pair of rails 120. The bottom surface of the box 10 may be supported by the pair of rails 120. In such a case, the box 10 may not have the protrusions 11.

Returning to FIG. 2, the shelf 100 is configured to contain the plurality of boxes 10. The shelf 100 is composed of a plurality of tiers and columns. The shelf 100 has a containing area A1, a containing area A2, and a containing area A3. The containing area A1 is an area where boxes 10*a*1 and 10*a*2 are contained, and containing area A2 is an area where boxes 10*a*3 and 10*a*4 are contained. The containing area A3 contains boxes 10*b*, 10*c*, 10*d*, 10*e*, 10*f*, and 10*g*. The boxes 10*a*1 to 10*a*4 and boxes 10*b* to 10*g* are specific examples of the boxes 10.

The containing area A1 and the containing area A2 are areas where the sorting robot 140 can approach. Boxes including items to be sorted (such boxes are hereinafter referred to as sorting source boxes) are disposed in one of the containing area A1 and containing area A2 and boxes including sorted items (such boxes are hereinafter referred to as sorting destination boxes) are disposed in the other. That is, the shelf 100 includes a column in which the sorting source boxes are contained and a column in which the sorting destination boxes are contained. Hereinafter, a case in which the sorting source boxes are disposed in the containing area A1 and the sorting destination boxes are disposed in the containing area A2 are described.

In the containing area A1, the boxes 10 in which a mixture of items of plurality of types are included and the boxes 10 in which a mixture of items of plurality of users are included are disposed. In the containing area A1, the boxes transported from outside a house where the shelf 100 is located may be disposed. At least one of the containing area A1 and containing area A2 is composed of a plurality of tiers (e.g., two tiers).

On the other hand, in the containing area A3, boxes for containing items of a predetermined kind and boxes for containing items of a predetermined user are disposed. For example, the box 10*b* contains items used by the father, the box 10*c* contains items used by the mother, and the box 10*d* contains items used by the child. For example, the box 10*e* contains kitchen supplies, the box 10*f* contains bathroom supplies, and the box 10*g* contains toilet supplies. To replenish the items in the box contained in the containing area A3, the box is taken out and stored in the containing area A2, and the sorting robot 140 replenishes the items.

The imaging unit 130 is attached downward to the top plate or the like of the housing 110. The imaging unit 130 is disposed at the place where it can photograph the boxes 10*a*1 and 10*a*3. When the boxes 10*a*1 and 10*a*3 are pulled out of the shelf 100, the imaging unit 130 can photograph the inside of the boxes 10*a*2 and 10*a*4. The imaging unit 130 outputs the photographed image to the management server 300.

The sorting robot 140 is attached to the guide rail 111 and can move in the Y-axis direction as indicated by the double-sided arrow. The sorting robot 140 includes a robot arm and a robot hand. The robot hand may be a suction hand or a gripping hand. Further, the sorting robot 140 is configured to be stretchable in the Z-axis direction and can approach not only the boxes 10*a*1 and 10*a*3 but also the boxes 10*a*2 and 10*a*4.

The sorting robot 140 transfers items from the boxes 10*a*1 and 10*a*2 to the boxes 10*a*3 and 10*a*4. The sorting robot 140 can recognize items using the image photographed by the imaging unit 130. After the items are transferred, the boxes 10*a*3 and 10*a*4 are stored in the containing area A3 of the shelf 100 by the transport robot 200. Note that the sorting robot 140 may move the boxes 10.

Figure 4:
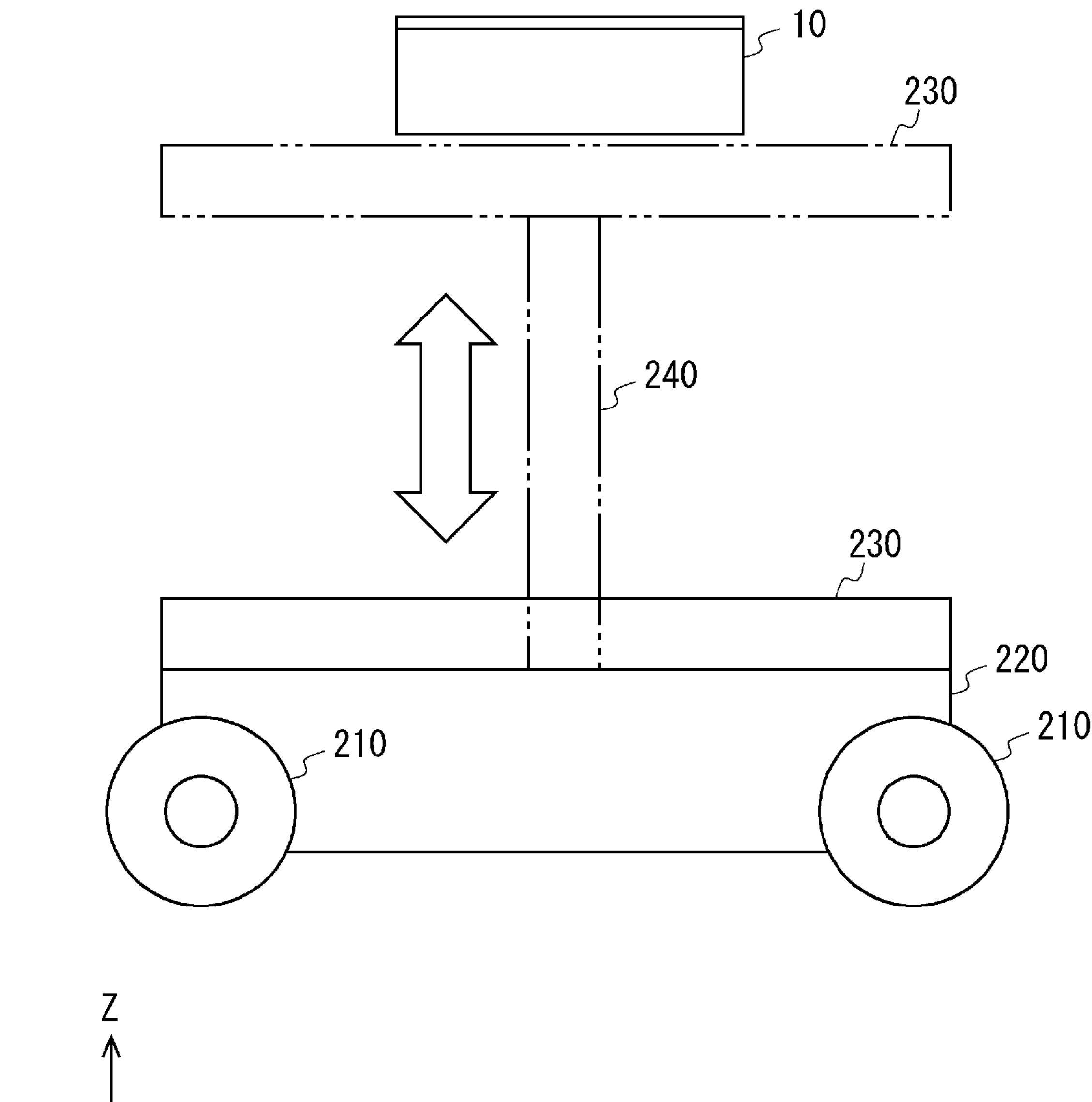
FIG. 4 is a schematic side view of a transport robot according to the first embodiment.

Next, a configuration of the transport robot 200 will be described with reference to FIG. 4. FIG. 4 is a schematic side view of the transport robot 200. The transport robot 200 includes wheels 210, a body part 220, a top plate 230, and a support 240. The two pairs of wheels 210 are rotatably fixed to a lower side of the body part 220 and are driven by a driving source (not shown) such as a motor.

As shown in FIG. 4, the top plate 230 is connected to the body part 220 with the extendable support 240 interposed therebetween. The top plate 230 is connected to an upper end of the support 240. The transport robot 200 places the box 10 on the top plate 230 and transports the box 10.

The support 240 has, for example, a telescopic expansion mechanism and is expanded and contracted by a driving source (not shown) such as a motor. The height of the top plate 230 can be changed by changing the length of the support 240 as shown by the blanked arrow. In this way, the transport robot 200 can put the boxes 10 in and takes them out of the containing areas whose heights are different from each other. The transport robot 200 can transfer the box 10 from the shelf 100 to the top plate 230 using a manipulator (not shown). The transport robot 200 can also transfer the box 10 from the top plate 230 to the shelf 100 using the manipulator.

Next, the functions of the management server 300 will be described with reference to FIG. 1. The management server 300 includes a sorting management unit 310. The sorting management unit 310 manages the sorting of items into the plurality of boxes 10 placed on the shelf 100. When the sorting robot 140 puts the item in or takes it of the box 10 contained in a lower tier, the sorting management unit 310 instructs the transport robot 200 to pull out the box contained in the upper tier.

First, the sorting management unit 310 instructs the transport robot 200 to store the sorting source boxes 10 in the containing area A1. Next, the sorting management unit 310 selects the sorting destination box 10 from among the boxes contained in the containing area A3 based on the items contained in the sorting source boxes 10. It is assumed that the information about the items contained in the sorting source boxes 10 are registered in the management server 300. A registration work may be performed at a distribution center from which the boxes are shipped.

The sorting management unit 310 may select the plurality of sorting destination boxes 10. Next, the sorting management unit 310 instructs the transport robot 200 to store the sorting destination boxes 10 in the containing area A2.

The sorting management unit 310 instructs the sorting robot 140 to transfer the item from the sorting source box 10 to the sorting destination box 10. When the item is transferred from the box 10*a*1 to the box 10*a*4 shown in FIG. 2, the sorting management unit 310 instructs the transport robot 200 to pull out the box 10*a*3 from the shelf 100. Similarly, when the item is transferred from the box 10*a*2 to the box 10*a*3, the sorting management unit 310 instructs the transport robot 200 to pull out the box 10*a*1 from the shelf 100. When transferring the item from the box 10*a*2 to the box 10*a*4, the sorting management unit 310 instructs the transport robot 200 to pull out the box 10*a*1 and the box 10*a*3 from the shelf 100. The transport robot 200 functions as transfer means to pull out each box 10 from the shelf 100.

Figure 5:
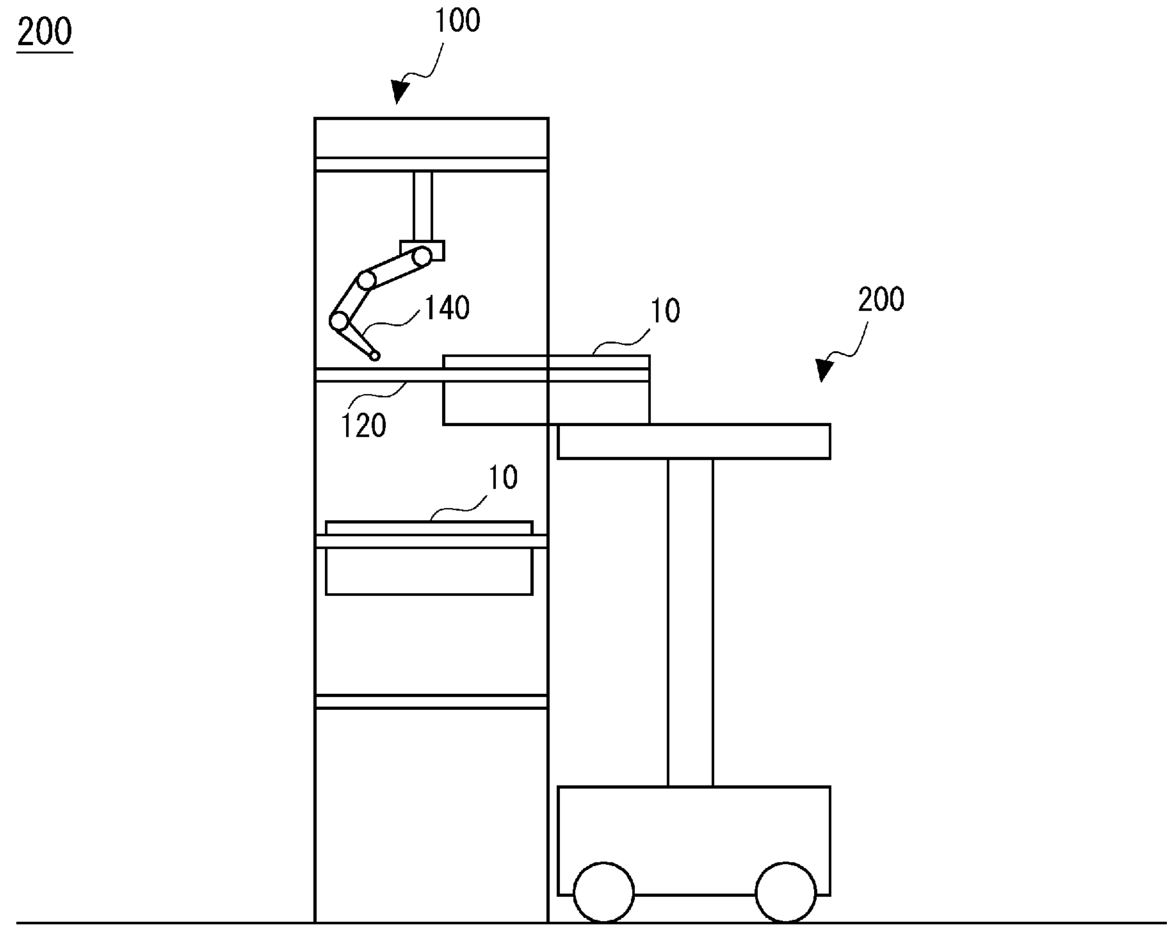
FIG. 5 is a diagram for explaining a method of pulling out a box.
Figure 5:
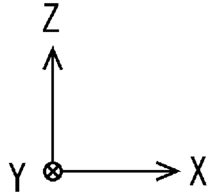

The transport robot 200 pulls the box 10 halfway out of the shelf 100 on the rail 120 as shown in FIG. 5. This enables the sorting robot 140 to put an item in or takes it out of both the box 10 contained in the upper tier and the box 10 contained in the lower tier. A specific explanation will be given with reference to FIG. 2. The sorting robot 140 can store the item contained in the box 10*a*1 in the box 10*a*3, pull the box 10*a*1 halfway out, and then store the item contained in the box 10*a*2 in the box 10*a*3. The sorting robot 140 can store one item contained in the box 10*a*1 in the box 10*a*3, pull out the box 10*a*3, and then store other items contained in the box 10*a*1 in the box 10*a*4. The sorting system 1000 can perform sorting quickly.

The sorting robot 140 may move the item contained in the box 10 in the depth direction (−Y direction) of the shelf 100 before pulling out the box 10. This makes it easier for the item to be positioned within a movable range of the sorting robot 140.

The imaging unit 130 may be installed so that the inside of the box 10*a*2 and the inside of the box 10*a*4 can be sufficiently photographed when the box 10*a*1 and the box 10*a*3 are pulled halfway out. For example, a direction in which the imaging unit 130 photographs images may be inclined forward with respect to the vertically downward direction. The direction in which the imaging unit 130 photographs images may be controllable. Alternatively, the item may be placed in advance on the depth direction side of the box 10. The amount in which the box 10 is pulled out may be determined according to an imaging range of the imaging unit 130.

If the shelf 100 has two or more sorting robots 140, one sorting robot 140 may pull the box 10 halfway out. That is, the sorting robot 140 may function as transfer means for pulling out each box 10 from the shelf 100. Alternatively, a pullout mechanism provided on the shelf 100 may also pull the box 10 halfway out.

Returning to FIG. 2, when the sorting of the item into the box 10*a*3 is completed or the sorting of the item into the box 10*a*4 is completed, the sorting management unit 310 instructs the transport robot 200 to store the box 10*a*3 or the box 10*a*4 in the containing area A3. When there is a box 10 for which a sorting work has not been completed, the sorting management unit 310 instructs the transport robot 200 to transfer the box 10 from the containing area A3 to the containing area A2.

Figure 6:
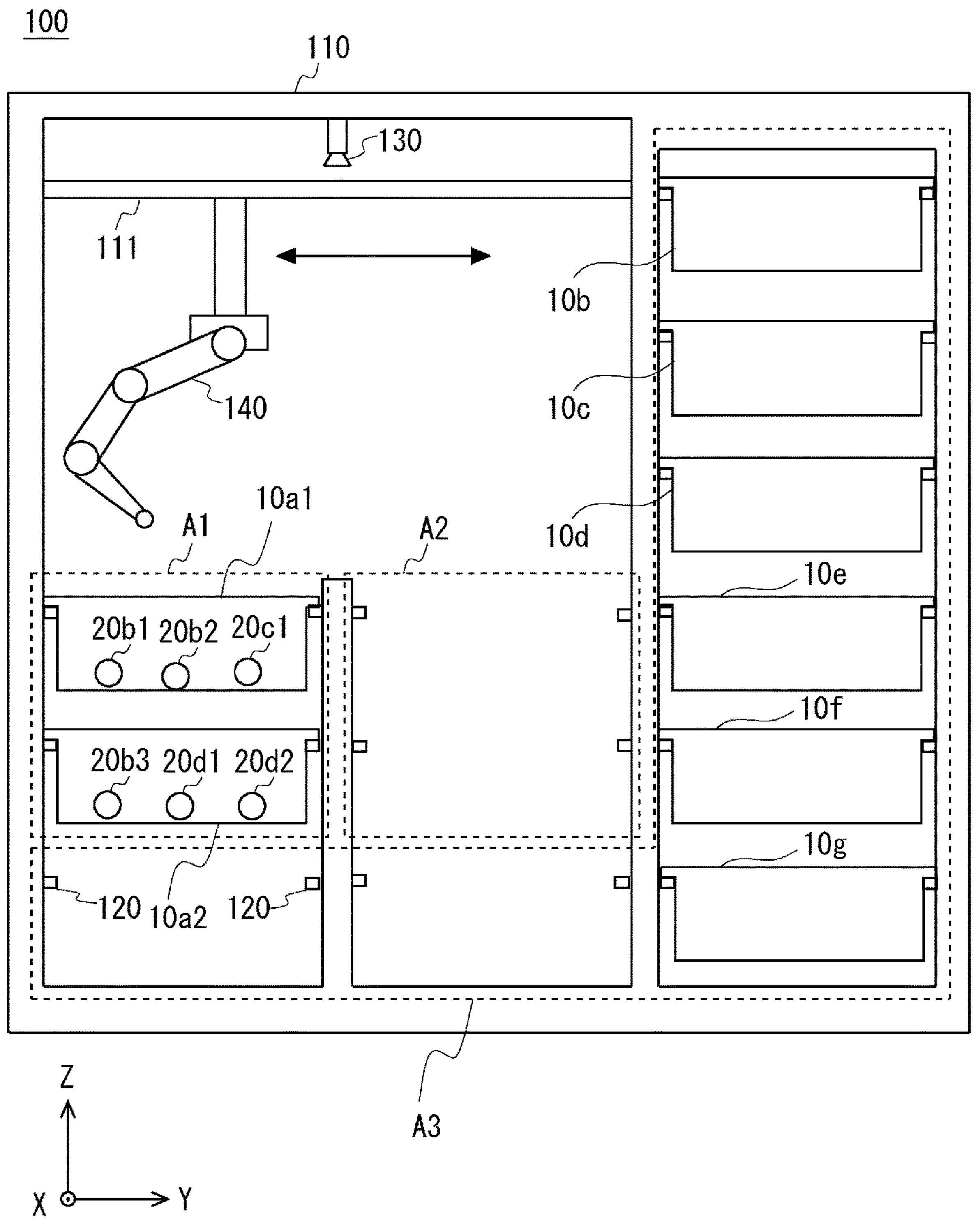
FIG. 6 is a diagram for explaining an example of a sorting method.

Next, one example of the operation of the sorting system 1000 according to the first embodiment will be described with reference to FIGS. 6 to 9. With reference to FIG. 6, the sorting source box 10*a*1 contains items 20*b*1, 20*b*2, and 20*c*1. The sorting source box 10*a*2 contains items 20*b*3, 20*d*1, and 20*d*2. The items 20*b*1 to 20*b*3 are used by the father and are contained in the box 10*b*. The item 20*c*1 is used by the mother and is contained in the box 10*c*. The items 20*d*1 and 20*d*2 are used by the child and are contained in the box 10*d*. That is, the box 10*b* is the sorting destination box for the items 20*b*1 to 20*b*3, the box 10*c* is the sorting destination box for the item 20*c*1, and the box 10*d* is the sorting destination box for the items 20*d*1 and 20*d*2.

Figure 7:
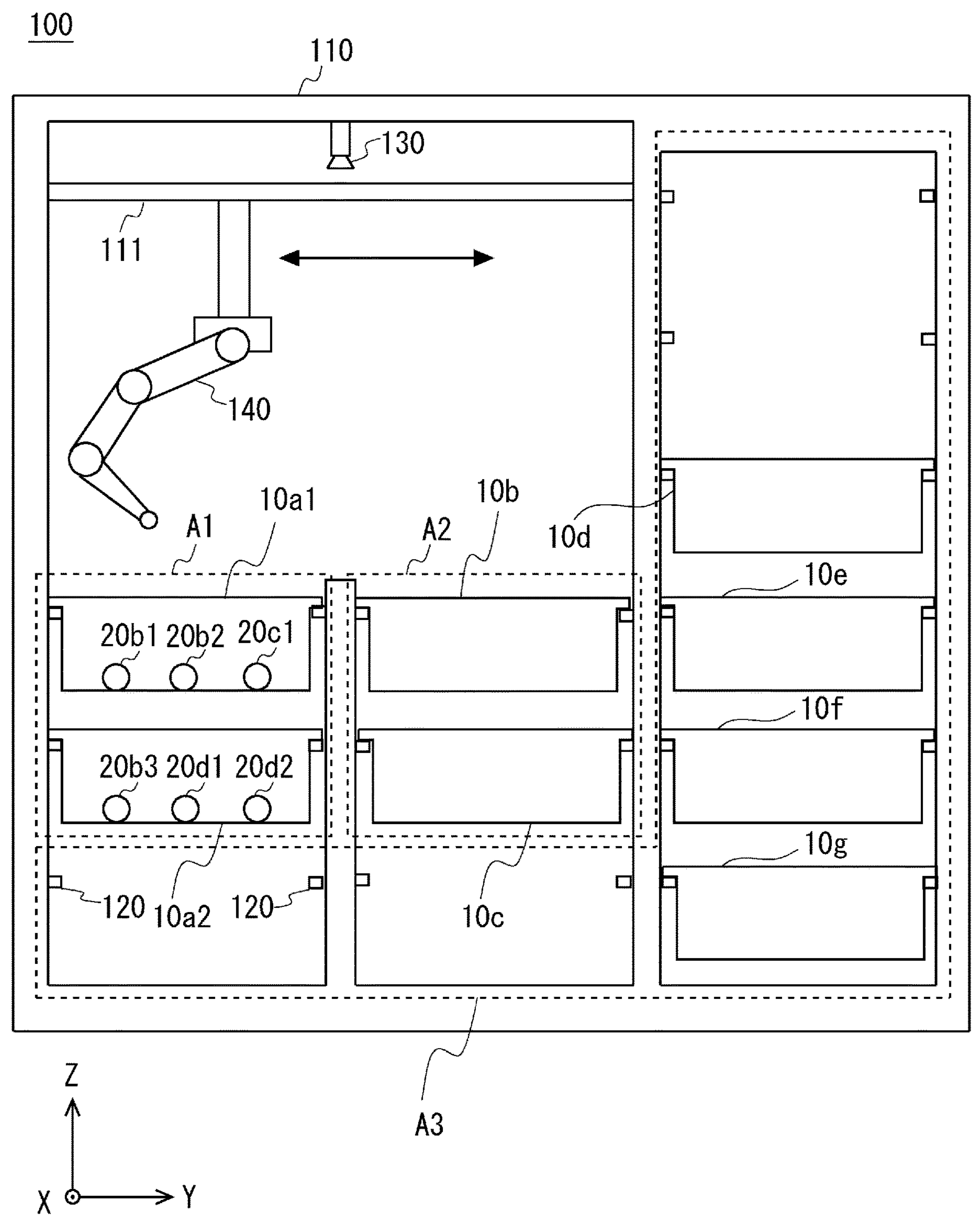
FIG. 7 is a diagram for explaining an example of the sorting method.

As shown in FIG. 7, the sorting system 1000 stores the boxes 10*b* and 10*c* in the containing area A2. The box 10*b* is stored in the upper tier of the containing area A2 and the box 10*c* is stored in the lower tier of the containing area A2. Next, the sorting robot 140 places the items 20*b*1 and 20*b*2 in the box 10*b*. The transport robot 200 then pulls the box 10*a*1 halfway out and the sorting robot 140 places the items 20*b*3 in the box 10*b*. This completes the sorting of the items into the box 10*b*.

Figure 8:
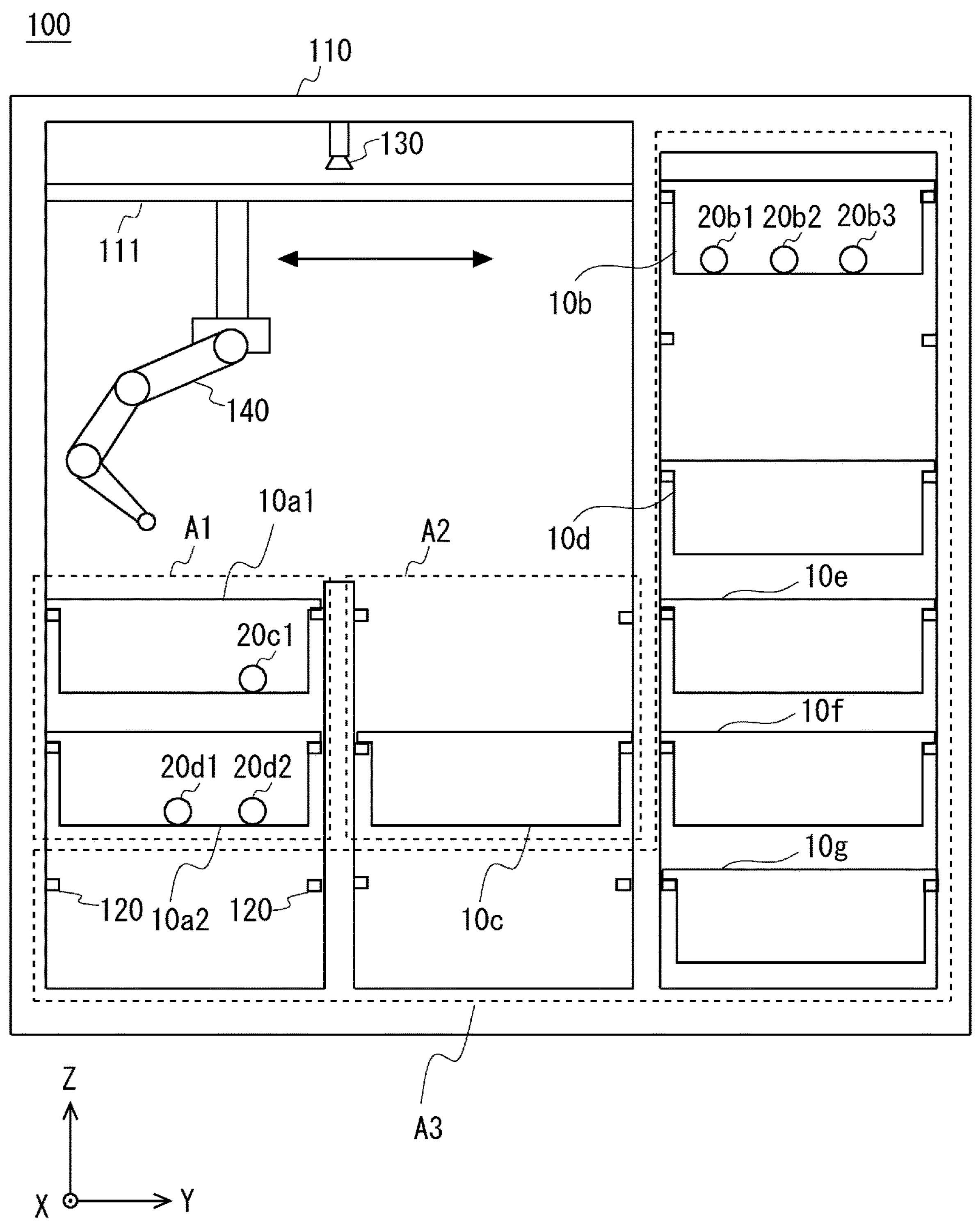
FIG. 8 is a diagram for explaining an example of the sorting method.

FIG. 8 shows that the box 10*b* is stored in the containing area A3 by the transport robot 200. The box 10*a*1 is pulled halfway out. The sorting robot 140 places the item 20*c*1 in the box 10*c* and the sorting of the items into the box 10*c* is completed. The sorting of the items from the box 10*a*1 is also completed. Although FIG. 8 shows the case where the box 10*b* is stored in the containing area A3, the box 10*b* may be pulled halfway out to store the item 20*c*1 in the box 10*c*.

Figure 9:
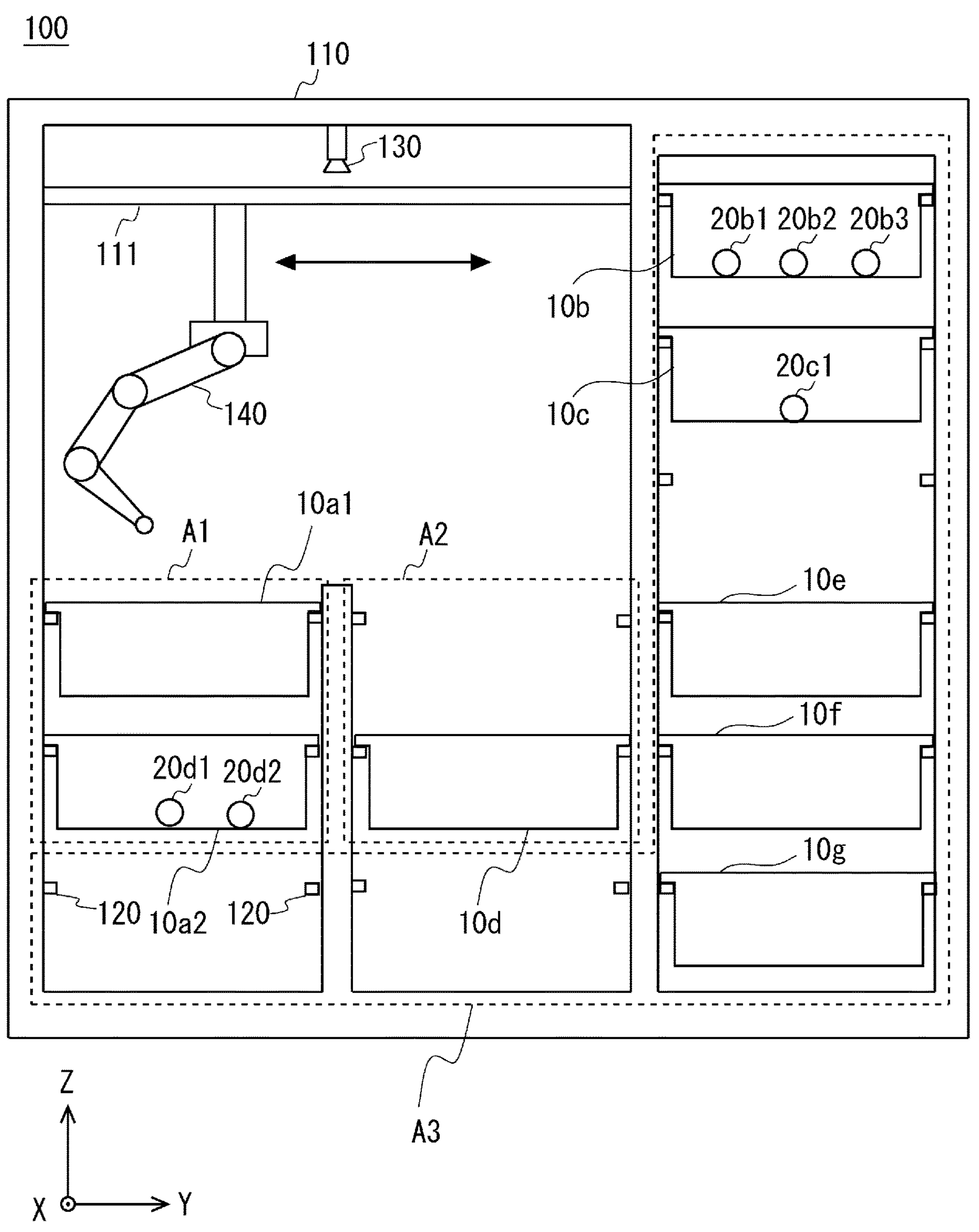
FIG. 9 is a diagram for explaining an example of the sorting method.

FIG. 9 shows a state in which the box 10*c* is stored in the containing area A3 and the box 10*d* is stored in the containing area A2 by the transport robot 200. The box 10*a*1 is pulled halfway out. The sorting robot 140 places the items 20*d*1 and 20*d*2 in the box 10*d* and sorting of the items into the box 10*d* is completed. The box 10*d* is then stored in the containing area A3.

The sorting system according to the first embodiment can reduce the time required for the sorting work, because items can be put in and taken out of both the boxes 10 contained in the upper tier of the shelf 100 and the boxes 10 contained on the lower tier of the shelf 100.

Also, by pulling the box 10 halfway out, it becomes easier to position both the boxes 10 within the movable range of the sorting robot 140, which makes the sorting work easier. If the box 10 is fully pulled out, there is a risk that the box 10 contained in the upper tier will be positioned outside the movable range of the sorting robot.

Second Embodiment

In the first embodiment, each of the box contained in the upper tier of the shelf and the box contained in the lower tier of the shelf is either a sorting destination box or a sorting source box. In the sorting system according to the second embodiment, a box in which an item is temporarily placed is disposed either on the upper tier or the lower tier.

Figure 10:
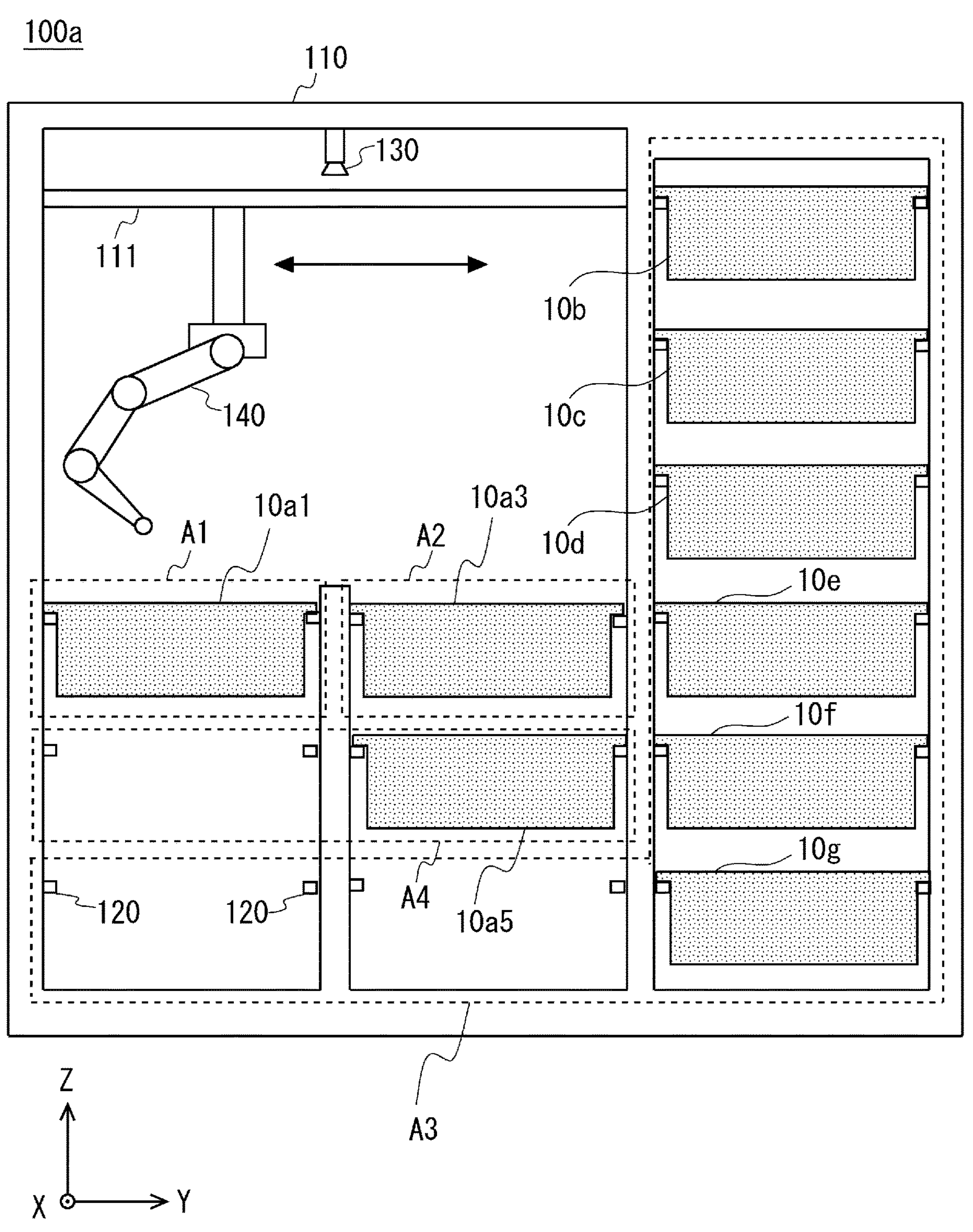
FIG. 10 is a schematic front view of a shelf according to a second embodiment.

A shelf 100*a* according to the second embodiment will be described with reference to FIG. 10. The shelf 100*a*, like the shelf 100, includes a housing 110, a plurality of pairs of rails 120, an imaging unit 130, and a sorting robot 140.

The shelf 100*a* has a containing area A1, a containing area A2, a containing area A3, and a containing area A4. The containing area A1 is an area where the box 10*a*1 is contained, and the containing area A2 is an area where the box 10*a*3 is contained. The containing area A3 contains the boxes 10*b*, 10*c*, 10*d*, 10*e*, 10*f*, and 10*g*. The box 10*a*5 is contained in the containing area A4.

The containing area A1, containing area A2 and containing area A4 are areas where the sorting robot 140 can approach. A sorting source box is disposed in the containing area A1 and a sorting destination box is disposed in the containing area A2. The box for temporarily placing an item is disposed in the containing area A4. A plurality of items are contained in the sorting source box.

Referring to FIG. 1, the sorting system according to the second embodiment has a management server 300 including a sorting management unit 310, as in the first embodiment. The sorting management unit 310 instructs the sorting robot 140 to transfer the items from the box 10*a*1 to the box 10*a*3.

There are cases where another item lies on an item to be transferred (which is hereinafter referred to as a transfer target item), or there is another item near the transfer target item. In such cases, it is difficult for the sorting robot 140 to grip or suck the transfer target item. Such items overlapping the transfer target item or present near the transfer target are referred to as obstacles.

In such a case, the sorting management unit 310 of the management server 300 instructs the transport robot 200 to pull the box 10*a*3 halfway out. Next, the sorting management unit 310 instructs the sorting robot 140 to transfer an obstacle from the box 10*a*1 to the box 10*a*5. Next, the sorting management unit 310 instructs the sorting robot 140 to transfer the transfer target item to the box 10*a*3.

The sorting system according to the second embodiment can reduce the time required for a sorting work when there is an obstacle to the sorting work.

Third Embodiment

In the first embodiment, a case where there are a plurality of boxes of sorting source boxes or sorting destination boxes, and they are contained in the upper and lower tiers of the shelf has been described. In the sorting system according to a third embodiment, the sorting source box and sorting destination box are contained in the upper and lower tiers, respectively. The sorting source box and sorting destination box may be contained in the lower and upper tiers, respectively.

Figure 11:
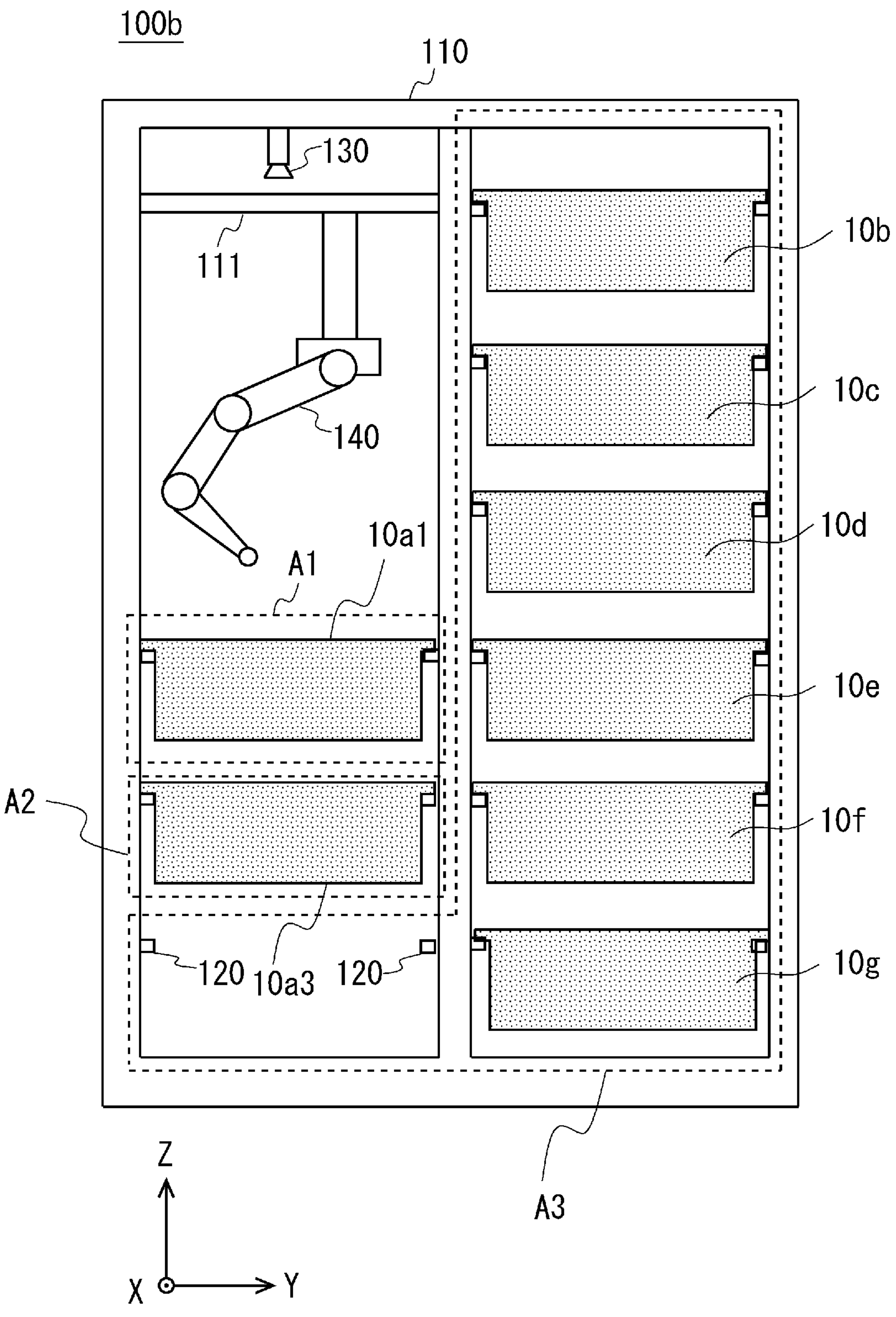
FIG. 11 is a schematic front view of a shelf according to a third embodiment.

A shelf 100*b* according to the third embodiment will be described with reference to FIG. 11. The shelf 100*b*, like the shelf 100, includes a housing 110, a plurality of pairs of rails 120, an imaging unit 130, and a sorting robot 140.

The shelf 100*a* has a containing area A1, a containing area A2, and a containing area A3. The containing area A1 is an area where the box 10*a*1 is contained, and the containing area A2 is an area where the box 10*a*3 is contained. The containing area A3 contains boxes 10*b*, 10*c*, 10*d*, 10*e*, 10*f*, and 10*g*.

The containing area A1 and the containing area A2 are areas where the sorting robot 140 can approach. A sorting source box is disposed in the containing area A1 and a sorting destination box is disposed in the containing area A2. The positions of the containing area A2 and the containing area A1 may be opposite.

The sorting system according to the third embodiment has a management server 300 including a sorting management unit 310, as in the first embodiment. The sorting management unit 310 of the management server 300 instructs the sorting robot 140 to grip or suck a transfer target item.

The sorting management unit 310 instructs the transport robot 200 to pull the box 10*a*1 halfway out. Next, the sorting management unit 310 instructs an item, which is the transfer target item, to be disposed in the box 10*a*3. Thus, an item, which is a transfer target item, can be transferred from the box 10*a*1 to the box 10*a*3.

In the third embodiment, the sorting source box and the sorting destination box are contained in one column, and thus the size of the shelf can be reduced.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The present disclosure is not limited to the above embodiments and may be changed as appropriate without departing from the scope.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A sorting system comprising:

a shelf in which a plurality of boxes are contained in a plurality of tiers;

transfer means for putting each box in or taking each said box out of the shelf; and a sorting robot attached to the shelf configured to put an item in or take the item out of each box, wherein the transfer means pulls the box contained in an upper tier halfway out and, while the box contained in the upper tier is in the halfway-out position and remains supported by the shelf, the sorting robot puts the item in or takes the item out of each of the box contained in the upper tier and the box contained in a lower tier.

2. The sorting system according to claim 1, wherein the shelf is composed of a plurality of tiers and a plurality of columns, and the plurality of columns include a column in which a box including an item to be sorted is contained and a column in which a box including a sorted item is contained, and each of the box contained in the upper tier and the box contained in the lower tier is the box including the item to be sorted, or each of the box contained in the upper tier and the box contained in the lower tier is the box including the sorted item.

3. The sorting system according to claim 1, wherein at least one of the box contained in the upper tier and the box contained in the lower tier is a box in which the item is temporarily placed during a sorting work.

4. The sorting system according to claim 1, wherein the shelf includes a column having the upper tier and the lower tier, and the box contained in the upper tier of the column is the box including the item to be sorted and the box stored in the lower tier of the column is the box including the sorted item, or the box stored in the upper tier of the column is the box including the sorted item and the box stored in the lower tier of the column is the box including the item to be sorted.

5. The sorting system according to claim 1, wherein while the box contained in the upper tier is in the halfway-out position, the sorting robot takes the item out of one of the box contained in the upper tier and the box contained in the lower tier and puts the item in the other of the box contained in the upper tier and the box contained in the lower tier.

6. A sorting method performed by a sorting system comprising:

a shelf in which a plurality of boxes are contained in a plurality of tiers;

transfer means for putting each box in or taking each said box out of the shelf; and a sorting robot attached to the shelf configured to put an item in or take the item out of each box, the sorting method comprising, by the transfer means, pulling the box contained in an upper tier halfway out and, while the box contained in the upper tier is in the halfway-out position and remains supported by the shelf, the sorting robot putting the item in or taking the item out of each of the box contained in the upper tier and the box contained in a lower tier.

7. The sorting method according to claim 6, wherein while the box contained in the upper tier is in the halfway-out position, the sorting robot takes the item out of one of the box contained in the upper tier and the box contained in the lower tier and puts the item in the other of the box contained in the upper tier and the box contained in the lower tier.

8. A non-transitory computer readable medium storing a program for causing a computer to execute a sorting method performed by a sorting system comprising:

a shelf in which a plurality of boxes are contained in a plurality of tiers;

transfer means for putting each box in or taking each said box out of the shelf; and a sorting robot attached to the shelf configured to put an item in or take the item out of each box, the sorting method comprising, by the transfer means, pulling the box contained in an upper tier halfway out and, while the box contained in the upper tier is in the halfway-out position and remains supported by the shelf, the sorting robot putting the item in or taking the item out of each of the box contained in the upper tier and the box contained in a lower tier.

9. The non-transitory computer readable medium according to claim 8, wherein while the box contained in the upper tier is in the halfway-out position, the sorting robot takes the item out of one of the box contained in the upper tier and the box contained in the lower tier and puts the item in the other of the box contained in the upper tier and the box contained in the lower tier.

* * * * *